United States Patent
Niwa et al.

(10) Patent No.: US 10,691,037 B2
(45) Date of Patent: Jun. 23, 2020

(54) PRODUCTION METHOD OF RUBBER COMPOSITION

(71) Applicants: ZEON CORPORATION, Tokyo (JP); ZEON Chemicals L.P., Louisville, KY (US)

(72) Inventors: Kazu Niwa, Tokyo (JP); Clark Cable, Louisville, KY (US)

(73) Assignees: ZEON CORPORATION, Tokyo (JP); ZEON CHEMICALS L.P., Louisville, KY (US)

(*) Notice: Subject to any disclaimer, the term of this patent is extended or adjusted under 35 U.S.C. 154(b) by 17 days.

(21) Appl. No.: 16/191,012

(22) Filed: Nov. 14, 2018

(65) Prior Publication Data

US 2019/0079426 A1 Mar. 14, 2019

Related U.S. Application Data

(63) Continuation of application No. 14/045,212, filed on Oct. 3, 2013, now abandoned.

(60) Provisional application No. 61/709,690, filed on Oct. 4, 2012.

(51) Int. Cl.
*G03G 15/02* (2006.01)
*C08L 71/03* (2006.01)
*C08L 9/02* (2006.01)
*C08L 63/00* (2006.01)

(52) U.S. Cl.
CPC ............ *G03G 15/0233* (2013.01); *C08L 9/02* (2013.01); *C08L 63/00* (2013.01); *C08L 71/03* (2013.01)

(58) Field of Classification Search
None
See application file for complete search history.

(56) References Cited

U.S. PATENT DOCUMENTS

| | | | |
|---|---|---|---|
| 3,717,592 A | | 2/1973 | Rave |
| 3,867,321 A | * | 2/1975 | Riew .......................... C08J 3/07 523/336 |
| 3,876,590 A | * | 4/1975 | Shimogawa ............. C08K 5/39 525/187 |
| 4,266,005 A | | 5/1981 | Nakamura et al. |
| 7,291,663 B2 | * | 11/2007 | Hattori .................... C08G 65/14 524/168 |
| 2004/0096247 A1 | | 5/2004 | Ki et al. |
| 2008/0021164 A1 | * | 1/2008 | Masuda ................ C08L 15/005 525/190 |
| 2011/0281703 A1 | | 11/2011 | Tajima et al. |

FOREIGN PATENT DOCUMENTS

| | | |
|---|---|---|
| JP | 9-146345 A | 6/1997 |
| JP | 09-309975 A | 12/1997 |
| JP | 2002-105304 A | 4/2002 |
| JP | 2008-138038 A | 6/2008 |
| JP | 2008-303390 A | 12/2008 |
| WO | WO 2010/024219 A1 | 3/2010 |

OTHER PUBLICATIONS

Chinese Office Action, dated Oct. 9, 2016, for Chinese Application No. 201380051842.3, including a machine translation.
English Translation of International Search Report of Corresponding PCT Application Application PCT/JP2013/076947 dated Jan. 7, 2014.
English Translation of Written Opinion of the International Search Authority of Corresponding PCT Application PCT/JP2013/076947 dated Jan. 7, 2014.
Extended European Search Report, dated May 11, 2016, for European Application No. 13843902.1.
Hourston, D.J., and Hughes, I.D., "Dynamic mechanical behavior of polyether ester-nitrile rubber blends," Polymer, 1981, vol. 22, pp. 127-129.
Ide, "Practical use of polymer alloy design," Kogyo Chosakai Publishing Co., Ltd., First Edition, First Printing, Sep. 1, 1996, pp. 29-34.
Japanese Decision of Refusal, dated Apr. 10, 2018, for corresponding Japanese Application No. 2014-539816, with English translation.
Japanese Notification of Reasons for Refusal, dated Jan. 23, 2018, for corresponding Japanese Application No. 2014-539816, with an English translation.
Society of Polymer Science, Japan, "Polymer Alloy Foundation, Application," 1st Edition 1st Printing, Tokyo Kagaku Dojin Co., Ltd., Apr. 1, 1981, pp. 7-8 (4 pages total).

* cited by examiner

*Primary Examiner* — William D Young
(74) *Attorney, Agent, or Firm* — Birch, Stewart, Kolasch & Birch, LLP

(57) ABSTRACT

To provide a method for producing a rubber composition which gives a cross-linked rubber which has a low volume resistivity value, which is low in hardness, and which is kept down in contamination of the photoconductor when used as a conductive member. A production method of a rubber composition comprising a step of mixing a polyether rubber which is dissolved in a solvent at 0.1 to 30 wt % of concentration and a liquid ethylenically unsaturated nitrile-conjugated diene copolymer rubber in a solution is provided.

8 Claims, No Drawings

PRODUCTION METHOD OF RUBBER COMPOSITION

CROSS REFERENCE TO RELATED APPLICATIONS

This application is a Continuation of co-pending U.S. application Ser. No. 14/045,212 filed on Oct. 3, 2013, which claims the benefit of priority to U.S. Provisional Application No. 61/709,690 filed on Oct. 4, 2012. The entire contents of all of the above applications are hereby incorporated by reference.

TECHNICAL FIELD

The present invention relates to a production method of a rubber composition, more particularly relates to a production method of a rubber composition which gives a cross-linked rubber which has a low volume resistivity value, which is low in hardness, and which is kept down in contamination of a photoconductor when used as a conductive member.

BACKGROUND ART

An electronic photo device such as an electronic photocopier, and an electronic photoprinter has a mechanism which uniformly charges an outer circumference of a photoconductive drum, then exposes a printing pattern or copying pattern on the outer circumference of the photoconductive drum so as to form an electrostatic latent image, deposits a toner on this electrostatic latent image to form (develop) a toner image, and transfers this toner image to copier paper or printer paper to print or copy the image.

In such an electronic photo device, as the charging roll for uniformly charging the outer circumference of the photoconductive drum, the developing roll for developing the electrostatic latent image of the outer circumference of the photoconductive drum to a toner image, the feed roll for feeding toner to the developing roll, and the transfer roll for transferring the toner image, a rubber roll is used. As such a rubber roll, usually a conductive rubber roll which is comprised of rubber to which conductivity imparting material such as carbon black is added is used.

However, while such a conductive rubber roll is improved in conductivity by addition of the conductivity imparting material, its hardness ends up becoming higher and therefore the "nip" when contacting another member can no longer be sufficiently obtained and sometimes trouble occurs in the electronic photo device.

To deal with such a problem, the method is known of blending into the conductive rubber roll a plasticizer or softener so as to cause the hardness to drop. However, there is the problem that a plasticizer or softener bleeds out to the roll circumference when applying voltage to the conductive rubber roll and thereby ends up contaminating other members, in particular, the photoconductor.

To solve the problem of contamination of the photoconductor due to such bleedout, for example, Patent Document 1 discloses a conductive rubber roll which contains a solid rubber (A) in 40 to 90 parts by weight, which is comprised of an ethylenically unsaturated nitrile monomer in 10 to 60 wt %, conjugated diene monomer in 40 to 90 wt %, and other ethylenically unsaturated monomer in 0 to 20 wt % polymerized together, a liquid rubber (B) in 10 to 60 parts by weight, which is comprised of an ethylenically unsaturated nitrile monomer in 10 to 60 wt %, conjugated diene monomer in 40 to 90 wt %, and other ethylenically unsaturated monomer in 0 to 20 wt % polymerized together, and another solid rubber (C) in 0 to 50 parts by weight. However, the conductive rubber roll which is disclosed in this Patent Document 1 is high in electrical resistance value, so is insufficient for achieving the higher speeds which are being sought from electronic photo devices in recent years.

As opposed to this, as art which lowers the electrical resistance value while solving the problem of bleedout, Patent Document 2 discloses a rubber composition for conductive rubber roll which contains a rubber component (A) in 100 parts by weight, which contains an epihalohydrin rubber (A1) which has a Mooney viscosity (ML1+4, 100° C.) of 20 to 200 in 40 to 90 wt % and a low molecular weight epihalohydrin polymer (A2) which has an $\eta sp/C$ of 0.01 to 0.5 in 60 to 10 wt %, and carbon black (B) in 10 to 250 parts by weight which has an average particle size of 90 to 560 nm and a specific surface area of 5 to 20 m2/g. However, in the art of Patent Document 2, there are the problems that so as to obtain lower the electrical resistance value, it is necessary to add a conductivity imparting material constituted by carbon black in a relatively large amount and further lowering the hardness of the obtained conductive rubber roll is difficult.

PRIOR ART DOCUMENTS

Patent Documents

[Patent Document 1] Japanese Patent Publication (A) No. 9-30997

[Patent Document 2] Japanese Patent Publication (A) No. 2002-105304

SUMMARY OF THE INVENTION

Problem to be Solved by the Invention

The present invention was made in view of such an actual situation and has as its object to provide a method for producing a rubber composition which gives a cross-linked rubber which has a low volume resistivity value, which is low in hardness, and which is kept down in contamination of the photoconductor when used as a conductive member.

Means for Solving the Problems

The inventors engaged in intensive research to achieve the above object and as a result discovered that by making a polyether rubber dissolve in a predetermined concentration in a solvent and mixing the polyether rubber which is dissolved in the solvent and a liquid ethylenically unsaturated nitrile-conjugated diene copolymer rubber in the solution, a rubber composition which gives a cross-linked rubber which has a low volume resistivity value, which is low in hardness, and which is kept down in contamination of the photoconductor when used as a conductive member is obtained and thereby completed the present invention.

That is, according to the present invention, there is provided a production method of a rubber composition comprising a step of mixing a polyether rubber which is dissolved in a solvent at 0.1 to 30 wt % of concentration and a liquid ethylenically unsaturated nitrile-conjugated diene copolymer rubber in a solution.

In the production method of the present invention, in a rubber component which forms the rubber composition, the ratio of the polyether rubber is preferably 60 to 99 wt % and the ratio of the liquid ethylenically unsaturated nitrile-conjugated diene copolymer rubber is preferably 40 to 1 wt %.

In the production method of the present invention, the liquid ethylenically unsaturated nitrile-conjugated diene copolymer rubber is preferably a liquid acrylonitrile-butadiene rubber.

In the production method of the present invention, the polyether rubber preferably contains ethylene oxide monomer units in an amount of 40 to 80 mol %.

According to the present invention, there is provided a rubber composition which is obtained by any of the above production methods.

Further, according to the present invention, there is provided a cross-linked rubber which is obtained by cross-linking the above rubber composition.

Furthermore, according to the present invention, there is provided a conductive member which uses the cross-linked rubber.

Effects of the Invention

According to the present invention, there are provided a rubber composition which gives a cross-linked rubber which has a low volume resistivity value, which is low in hardness, and which is kept down in contamination of the photoconductor when used as a conductive member and a cross-linked rubber and conductive member which are obtained by using such a rubber composition and effectively prevent contamination of a photoconductor.

DESCRIPTION OF EMBODIMENTS

A production method of a rubber composition of the present invention has a step of mixing a polyether rubber which is dissolved in a solvent at 0.1 to 30 wt % of concentration and a liquid ethylenically unsaturated nitrile-conjugated diene copolymer rubber in a solution.

In the following, first, the components which form the rubber composition which is produced by the present invention will be explained.

The rubber composition which is produced according to the present invention contains a polyether rubber and a liquid ethylenically unsaturated nitrile-conjugated diene copolymer rubber.

<Polyether Rubber>

The polyether rubber which is used in the present invention is not particularly limited so long as a rubber which has, as main structural unit, oxyalkylene repeating units which are obtained by polymerizing an oxirane monomer by ring opening polymerization. The type of the oxirane monomer is also not particularly limited, but the polyether rubber which is used in the present invention preferably contains ethylene oxide monomer units based on an ethylene oxide monomer. The ratio of content of the ethylene oxide monomer units is, in the total monomer units of the polyether rubber, preferably 40 to 80 mol %, more preferably 45 to 75 mol %, furthermore preferably 50 to 70 mol %. If the ratio of content of the ethylene oxide monomer units is too small, the volume resistivity value in the case made into a cross-linked rubber is liable to become higher. On the other hand, if the ratio of content of the ethylene oxide monomer units is too large, when using the obtained cross-linked rubber for a conductive roll for an electronic photo device etc., contamination of the photoconductor is liable to occur.

Further, the polyether rubber which is used in the present invention preferably contains, in addition to the ethylene oxide monomer units, units of an oxirane monomer which can be copolymerized with ethylene oxide. As the oxirane monomer which can be copolymerized with ethylene oxide, C3 to C20 alkylene oxide, C4 to C10 glycidyl ether, oxide of an aromatic vinyl compound, cross-linkable oxirane monomers in which cross-linkable groups are introduced to these oxirane monomers, etc. may be mentioned. Among these as well, from the viewpoint of cross-linking, a cross-linkable oxirane monomer is preferable. These oxirane monomers which can be copolymerized with ethylene oxide may be used as single type alone or as two types or more combined.

As specific examples of C3 to C20 alkylene oxides, linear alkylene oxides such as propylene oxide, 1,2-epoxybutane, 1,2-epoxy-isobutane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane, and 1,2-epoxyeicosan; cyclic alkylene oxides such as 1,2-epoxy cyclopentane, 1,2-epoxy cyclohexane, and 1,2-epoxy cyclododecane; etc. may be mentioned.

As specific examples of C4 to C10 glycidyl ethers, alkylglycidyl ethers such as methylglycidyl ether, ethylglycidyl ether, and butylglycidyl ether; arylglycidyl ethers such as phenylglycidyl ether; etc. may be mentioned.

As specific examples of oxides of an aromatic vinyl compound, styrene oxide, etc. may be mentioned.

As cross-linkable oxirane monomers, oxirane monomers in which cross-linkable groups are introduced to the oxirane monomers such as the above-mentioned C3 to C20 alkylene oxide, and C4 to C10 glycidyl ether, etc. may be mentioned. The cross-linkable groups are not particularly limited, but a vinyl group, epoxy group, amino group, carboxyl group, acid anhydride group, hydroxyl group, halogen atom, etc. may be mentioned. Among these as well, a vinyl group and halogen atom are preferable.

As specific examples of a cross-linkable oxirane monomer which has a vinyl group, ethylenically unsaturated glycidyl ethers such as vinylglycidyl ether, allylglycidyl ether, butenylglycidyl ether, and o-allylphenylglycidyl ether; diene monoepoxides such as butadiene monoepoxide; glycidyl esters of ethylenically unsaturated carboxylic acid such as glycidyl acrylate, and glycidyl methacrylate; etc. may be mentioned. Among these, ethylenically unsaturated glycidyl ethers are preferable, while allyl glycidyl ether is particularly preferable.

In the polyether rubber which is used in the present invention, the ratio of content of the cross-linkable oxirane monomer units which have a vinyl group is, in the total monomer units of the polyether rubber, preferably 1 to 15 mol %, more preferably 2 to 12 mol %, furthermore preferably 3 to 10 mol %. If the ratio of content of the cross-linkable oxirane monomer units which have a vinyl group is too small, the obtained cross-linked rubber is liable to deteriorate in compression set, while conversely if too large, during the polymerization reaction, a gelation reaction etc. easily occurs and the moldability is liable to decline.

Further, as specific examples of a cross-linkable oxirane monomer which has a halogen atom, epihalohydrins such as epichlorohydrin, epibromohydrin, epiiodohydrin, and epifluorohydrin; etc. may be mentioned. Among these, epichlorohydrin is preferable.

In the polyether rubber which is used in the present invention, the ratio of content of the cross-linkable oxirane monomer units which have a halogen atom is, in the total monomer units of the polyether rubber, preferably 5 to 59 mol %, more preferably 13 to 53 mol %, furthermore preferably 20 to 47 mol %. If the ratio of content of the cross-linkable oxirane monomer units which have a halogen atom is too small, the obtained cross-linked rubber is liable to deteriorate in tensile strength, elongation, and compression set. On the other hand, if the ratio of content is too large, the obtained cross-linked rubber will sometimes rise in volume resistivity value.

Note that, in the polyether rubber which is used in the present invention, the ratio of content of monomer units based on an oxirane monomer which is able to be copolymerized with ethylene oxide other than the cross-linkable oxirane monomer units which have a vinyl group and the cross-linkable oxirane monomer units which have a halogen atom is, in the total monomer units of the polyether rubber, preferably 30 mol % or less, more preferably 20 mol % or less, furthermore preferably 10 mol % or less. If the ratio of content of these monomer units is too large, the obtained cross-linked rubber is liable to end up becoming larger in volume resistivity value.

The polyether rubber which is used in the present invention can, for example, be obtained by using the solution polymerization method or solvent slurry polymerization method etc. to polymerize the above-mentioned monomers by ring opening polymerization.

The polymerization catalyst which is used for the polymerization is not particularly limited so long as a catalyst generally used for polyether polymerization. As the polymerization catalyst, for example, a catalyst obtained by reacting water and acetyl acetone with organic aluminum (Japanese Examined Patent Publication (B) No. 35-15797); a catalyst obtained by reacting phosphoric acid and triethylamine with triisobutyl aluminum (Japanese Examined Patent Publication (B) No. 46-27534); a catalyst obtained by reacting an organic acid salt of diazabicyclo undecene and phosphoric acid with triisobutyl aluminum (Japanese Examined Patent Publication (B) No. 56-51171); a catalyst obtained by reacting a partial hydrolyzed product of aluminum alkoxide and an organozinc compound (Japanese Examined Patent Publication (B) No. 43-2945); a catalyst obtained by reacting an organozinc compound and polyvalent alcohol (Japanese Examined Patent Publication (B) No. 45-7751); a catalyst obtained by reacting dialkyl zinc and water (Japanese Examined Patent Publication (B) No. 36-3394); a catalyst obtained by reacting tributyl tin chloride and tributyl phosphate (Japanese Patent (B) 3223978); etc. may be mentioned.

The polymerization solvent is not particularly limited so long as an inert solvent, but, for example, aromatic hydrocarbons such as benzene, and toluene; linear saturated hydrocarbons such as n-pentane, and n-hexane; cyclic saturated hydrocarbons such as cyclopentane, and cyclohexane; etc. may be used. Among these as well, when using the solution polymerization method for ring opening polymerization, from the viewpoint of the solubility of the polyether rubber, use of aromatic hydrocarbons is preferable and toluene is more preferable.

The polymerization reaction temperature is preferably 20 to 150° C., while 50 to 130° C. is more preferable. The polymerization form may be the batch method, the semi-batch method, the continuous method, or any other method.

The polyether rubber may be either copolymerization type of block copolymerization or random copolymerization, but, in particular, when using ethylene oxide as a monomer, a random copolymer causes the crystallinity of the polyethylene oxide to drop more and is less likely to detract from rubber elasticity, so is preferred.

The polyether rubber which is used in the present invention has a weight average molecular weight, converted to polystyrene using gel permeation chromatography, of preferably 200,000 to 2,000,000, more preferably 500,000 to 1,500,000. If the weight average molecular weight is too high, the Mooney viscosity becomes higher and molding is liable to become difficult. On the other hand, if the weight average molecular weight is too low, the obtained cross-linked rubber is liable to deteriorate in compression set.

The polyether rubber which is used in the present invention has a Mooney viscosity (polymer Mooney viscosity ML1+4,100° C.) of preferably 20 to 120, more preferably 30 to 100. If the Mooney viscosity is too high, molding processability is impaired and molding for conductive member applications becomes difficult, while if the Mooney viscosity is too low, the obtained cross-linked rubber is liable to drop in mechanical strength.

<Liquid Ethylenically Unsaturated Nitrile-Conjugated Diene Copolymer Rubber>

The liquid ethylenically unsaturated nitrile-conjugated diene copolymer rubber which is used in the present invention (below, suitably referred to as the "liquid nitrite rubber") is an ethylenically unsaturated nitrile-conjugated diene copolymer rubber which has a liquid state at ordinary temperature (which has fluidity at ordinary temperature) and has a weight average molecular weight, converted to polystyrene using gel permeation chromatography, of preferably 1,000 to 50,000, more preferably 3,000 to 30,000, furthermore preferably 3,000 to 15,000. Further, the liquid nitrite rubber which is used in the present invention has a polymer Mooney viscosity (ML1+4,100° C.), which is measured based on JIS K6300, of usually 1 or less or cannot be measured for Mooney viscosity.

The liquid nitrite rubber which is used in the present invention is usually obtained by copolymerization of an ethylenically unsaturated nitrile monomer, a conjugated diene monomer, and, used in accordance with need, another monomer which can be copolymerized with these.

As the ethylenically unsaturated nitrite monomer, for example, acrylonitrile, methacrylonitrile, α-chloroacrylonitrile, α-methylacrylonitrile, α-methoxyacrylonitrile, α-ethoxyacrylonitrile, nitrile crotonate, nitrile cinnamate, dinitrile itaconate, dinitrile maleate, dinitrile fumarate, etc. may be mentioned. Among these, acrylonitrile is suitable. These ethylenically unsaturated nitrile monomers may be used as single type alone or as two types or more combined. The ratio of content of the ethylenically unsaturated nitrile monomer units in the liquid nitrile rubber is, in the total monomer units, preferably 10 to 60 wt %, more preferably 15 to 50 wt %.

As the conjugated diene monomer, for example, 1,3-butadiene, isoprene, 1,3-pentadiene, 1,3-hexadiene, 2,3-dimethylbutadiene, 4,5-diethyl-1,3-octadiene, 3-butyl-1,3-octadiene, chloroprene, 2,3-dichlorobutadiene, 1,3-cyclopentadiene, etc. may be mentioned. Among these, 1,3-butadiene is suitable. These conjugated diene monomers may be used as single type alone or as two types or more combined. The ratio of content of the conjugated diene monomer units in the liquid nitrile rubber is, in the total monomer units, preferably 40 to 90 wt %, more preferably 50 to 85 wt %.

As the copolymerizable other monomer, ethylenically unsaturated monocarboxylic acids such as acrylic acid, methacrylic acid, crotonic acid, and cinnamic acid; ethylenically unsaturated polyvalent carboxylic acids and their anhydrides such as maleic acid, anhydrous maleic acid, fumaric acid, itaconic acid, anhydrous itaconic acid, citraconic acid, and mesaconic acid; monoalkyl esters of ethylenically unsaturated monocarboxylic acids such as methyl acrylate, methyl methacrylate, ethyl acrylate, propyl acrylate, butyl acrylate, ethyl methacrylate, and amyl acrylate; full alkyl esters of ethylenically unsaturated polyvalent carboxylic acids such as diethyl maleate, dimethyl itaconate, and dimethyl maleate; partial alkyl esters of ethylenically unsaturated polyvalent carboxylic acids such as monoethyl maleate, monomethyl itaconate, and monomethyl maleate; monoamides of ethylenically unsaturated monocarboxylic acids such as acrylamide, methacrylamide, amidecrotonate, and amidecinnamate; aromatic vinyl monomers such as styrene, α-methylstyrene, o-methylstyrene, m-methylstyrene, p-methylstyrene, p-t-butylstyrene, o-methoxystyrene, o-chlorostyrene, m-chlorostyrene, p-chlorostyrene, 1,1-diphenylethylene, N,N-dimethyl-p-aminostyrene, and vinyl pyridine; vinyl chloride, vinylidene chloride, vinyl acetate, allyl acetate, etc. may be mentioned. The ratio of content of the units of the copolymerizable other monomers is preferably 20 wt % or less, more preferably 15 wt % or less.

Therefore, the liquid nitrile rubber which is used in the present invention is preferably a liquid acrylonitrile-butadiene rubber.

A production method of the liquid nitrile rubber is not particularly limited. The known emulsion polymerization etc. may be used for production. Note that, after polymerization, hydrogen may also be added to the carbon-carbon unsaturated bond parts of the liquid nitrile rubber.

<Production method of Rubber Composition>

The production method of a rubber composition of the present invention is characterized by having the step of rendering the above-mentioned polyether rubber in a state dissolved at 0.1 to 30 wt % of concentration in a solvent and mixing this with the above-mentioned liquid ethylenically unsaturated nitrile-conjugated diene copolymer rubber (liquid nitrile rubber) in the solution. That is, the production method of a rubber composition of the present invention is characterized by mixing a polyether rubber and a liquid nitrile rubber at which time rendering the polyether rubber in a state dissolved in 0.1 to 30 wt % of concentration in a solvent and mixing the polyether rubber and the liquid nitrile rubber in a solution in the state of the solution.

According to the present invention, by rendering the polyether rubber in a state dissolved in 0.1 to 30 wt % of concentration in a solvent and mixing the polyether rubber and the liquid nitrile rubber in a solution, the obtained rubber composition can be made one which gives a cross-linked rubber which has a low volume resistivity value, which is low in hardness, and which is kept down in contamination of the photoconductor when used as a conductive member.

The solvent which causes the polyether rubber to dissolve is not particularly limited so long as a solvent which can dissolve a polyether rubber and liquid nitrile rubber. Aromatic hydrocarbons such as benzene, and toluene; ethers such as tetrahydrofuran, anisole, and diethyl ether; esters such as ethyl acetate, and ethyl benzoate; ketones such as acetone, 2-butanone, and acetophenone; aprotic polar solvents such as acetonitrile, dimethylformamide, and dimethylsulfoxide; etc. may be mentioned. These solvents may be used as single type alone or as two or more types combined.

At the time of making the polyether rubber dissolve in a solvent, the concentration of the polyether rubber in the polyether rubber solution is 0.1 to 30 wt %, preferably 1 to 30 wt %, more preferably 5 to 30 wt %. If the concentration of the polyether rubber is too low, the productivity is liable to become inferior, while if the concentration of the polyether rubber is too high, when using the obtained cross-linked rubber as the conductive roll of an electronic photo device, contamination of the photoconductor is liable to become remarkable.

Note that, in the production method of a rubber composition of the present invention, the ratios of content of the polyether rubber and liquid nitrile rubber in the rubber composition are not particularly limited, but, in the rubber component which forms the rubber composition, the ratio of content of the polyether rubber is preferably 60 to 99 wt %, more preferably 70 to 97 wt %. Further, in the rubber component which forms the rubber composition, the ratio of content of the liquid nitrile rubber is preferably 40 to 1 wt %, more preferably 30 to 3 wt %. If the ratio of content of the polyether rubber is too low, the obtained cross-linked rubber is liable to deteriorate in volume resistivity. Further, if the ratio of content of the liquid nitrile rubber is too low, the obtained cross-linked rubber is liable to become too high in hardness.

Note that, in the production method of the present invention, the method of rendering the polyether rubber in a state dissolved in the avobe concentration in a solvent is not particularly limited, but, for example, when polymerizing the polyether rubber by the solution polymerization method or other method which uses a solvent in which the polyether rubber dissolves, the method of use in the state dissolved in the solvent which was used for polymerization, the method of removing the solvent which was used for polymerization by the later explained steam stripping or other method, obtaining crumb shaped or solid shaped rubber, then dissolving this in the same solvent or other solvent, etc. may be mentioned. Note that, in the method of use in the state dissolved in the solvent which was used for polymerization, the concentration of the solution of polyether rubber may be suitably adjusted to become the above range of concentration. Further, when polymerizing the polyether rubber by the solvent slurry polymerization method or other method using a solvent in which polyether rubber is insoluble, it is necessary to remove the solvent which was used for the polymerization by decantation or other method, then dissolve the polyether rubber in another solvent in which it dissolves.

In the production method of the present invention, the method of mixing the polyether rubber and the liquid nitrile rubber is not particularly limited, but, for example, (1) the method of making the polyether rubber dissolve in the above concentration in a solvent, placing the solution of polyether rubber in a stirring vessel for stirring, and adding liquid nitrile rubber to the stirring vessel while stirring, (2) the method of placing the liquid nitrile rubber in a stirring vessel for stirring and adding the solution of polyether rubber to that stirring vessel while stirring, furthermore, (3) the method of placing the solution of polyether rubber and liquid nitrile rubber in a stirring vessel and stirring these, etc. may be mentioned. Note that, at this time, the liquid nitrile rubber may be used in state made to dissolved in a solvent or may be used as is without dissolving in a solvent. The temperature at the time of mixing is not particularly limited, but usually is 0 to 90° C., preferably 15 to 85° C., while the mixing time is usually 5 to 600 minutes, preferably 10 to 300 minutes.

Further, in the production method of the present invention, the thus obtained rubber composition is preferably coagulated and dried to remove the solvent etc. which was used for mixing and obtain a solid form rubber composition which is suitable for cross-linking. As the coagulation and drying method, it is possible to use a method which is usually performed in the field of rubber, but, for example, as the coagulation method, the ordinary methods of steam stripping or precipitation which uses a poor solvent etc. may be used. Further, as the drying method, the method using compression wringer such as rolls, Banbury type dehydrator, and screw extruder type dehydrator; dryer such as kneader type dryer, expander dryer, hot air dryer, and reduced pressure dryer; etc. may be mentioned.

The rubber composition which is obtained by the production method of the present invention is preferably further made to include a cross-linking agent. The cross-linking agent is not particularly limited so long as one which can cross-link the above-mentioned rubber component, but from the viewpoint of enabling co-cross-linking of a polyether rubber and liquid nitrile rubber, sulfur such as powdered sulfur, precipitated sulfur, colloidal sulfur, insoluble sulfur, and high dispersion sulfur; sulfur-containing compounds such as sulfur monochloride, sulfur dichloride, morpholin disulfide, alkylphenol disulfide, dibenzothiazyl disulfide, N,N'-dithiobis(hexahydro-2H-azenopin-2), phosphorus-containing polysulfide, and polymer polysulfide; are preferable. These cross-linking agents may be used as single type alone or as two or more types combined. As the ratio of formulation of the cross-linking agent, with respect to the above-mentioned rubber component 100 parts by weight, 0.1 to 10 parts by weight is preferable, 0.2 to 7 parts by weight is more preferable, and 0.3 to 5 parts by weight is furthermore preferable. If the amount of formulation of the cross-linking agent is too small, the cross-linking speed becomes slow, the obtained cross-linked rubber falls in productivity, and, when polishing the cross-linked rubber for use, the polishability is liable to fall. On the other hand, if the amount of formulation is too great, the obtained cross-linked rubber may become higher in hardness and the cross-linking agent may bloom.

When using, as the cross-linking agent, sulfur or a sulfur-containing compound, a cross-linking acceleration aid and a cross-linking accelerator are preferably jointly used. As the cross-linking acceleration aid, for example, zinc oxide, and stearic acid, etc. may be mentioned. As the cross-linking accelerator, for example, a guanidine-based compound; aldehyde-amine-based compound; aldehyde-ammonia-based compound; thiazole-based compound; sulfenamide-based compound; thiourea-based compound; thiuram-based compound; dithiocarbamic acid sale-based compound; etc. may be used. The cross-linking acceleration aid and the cross-linking accelerator may be each used as single type alone or as two or more types combined. The use amounts of each of the cross-linking acceleration aid and the cross-linking accelerator is, with respect to 100 parts by weight of the above-mentioned rubber component, preferably 0.01 to 15 parts by weight, and more preferably 0.1 to 10 parts by weight. If the amounts of use of the cross-linking acceleration aid and the cross-linking accelerator are too great, the cross-linking speed is liable to become too fast and blooming is liable to occur at the surface of the obtained cross-linked rubber. On the other hand, if too small, the cross-linking speed is liable to be slow and the productivity to drop or the cross-linking is liable to not proceed sufficiently and the obtained cross-linked rubber to become inferior in mechanical properties.

Further, the rubber composition which is obtained by the production method of the present invention may contain, other than the above-mentioned ingredients, other known additives which are usually blended into rubber. Such additives are not particularly limited, but, for example, fillers such as carbon black; acid acceptor; reinforcing agent; antioxidant; UV absorbing agent; light stabilizer; tackifier; surfactant; conductivity imparting material; electrolytic substance; coloring agent (dye or pigment); flame retardant; anti-static agent; etc. may be mentioned.

Furthermore, the rubber composition which is obtained by the production method of the present invention may also contain, in a range not detracting from the advantageous effects of the present invention, as desired another rubber other than the above polyether rubber and liquid nitrile rubber. As the other rubber, for example, solid acrylonitrile-butadiene rubber; natural rubber; butadiene rubber; isoprene rubber; styrene-butadiene rubber; ethylene-propylene rubber; ethylene-propylene-diene rubber; polyurethane rubber; acrylic rubber; fluoro rubber; silicone rubber; etc. may be mentioned. Note that, among the above other rubbers, solid acrylonitrile-butadiene rubber, unlike the above-mentioned liquid nitrile rubber, is an acrylonitrile-butadiene rubber which is in a solid state at ordinary temperature (does not have fluidity at ordinary temperature). When mixing in these other rubbers, these rubbers may be used as single type alone or as two types or more combined. As the amount, in the rubber component which forms the rubber composition, 39 wt % or less is preferable, while 27 wt % or less is more preferable.

Note that, when mixing in a cross-linking agent or other additive or other rubber, these may be added to the rubber composition before treating it to remove the solvent etc., but from the viewpoint of the dispersability, the method of adding them to the solid rubber composition after removing the solvent etc. and kneading them in it is preferable. For example, it is possible to knead the additives other than the cross-linking agent and the cross-linking accelerator with the rubber component, then mix the cross-linking agent and the cross-linking accelerator with the mixture to obtain a rubber composition. At the time of formulation and kneading, for example, a kneader, Bambury mixer, open roll, calendar roll, extruder, or any other kneading and molding machine may be used alone or in combination for kneading and molding. As the temperature of kneading the additives other than the cross-linking agent and the cross-linking accelerator with the rubber component, 20 to 200° C. is preferable, and 20 to 150° C. is more preferable, as the kneading time, 30 seconds to 30 minutes is preferable, and as the kneading temperature of the mixture and the cross-linking agent and the cross-linking accelerator, 100° C. or less is preferable, while 0 to 80° C. is more preferable.

<Cross-linked rubber>

The cross-linked rubber of the present invention is obtained by cross-linking the above-mentioned rubber composition which is obtained by the production method of the present invention, preferably is obtained by cross-linking the rubber composition including a cross-linking agent.

The method of cross-linking the rubber composition which is obtained by the production method of the present invention to obtain the cross-linked rubber is not particularly limited, but the cross-linking may be performed simultaneously with the molding or the cross-linking may be performed after the molding. As the temperature at the time of molding, 20 to 200° C. is preferable, while 40 to 180° C. is more preferable. As the heating temperature at the time of cross-linking, 130 to 200° C. is preferable, while 140 to 200° C. is more preferable. If the temperature at the time of cross-linking is too low, a long cross-linking time is liable to become necessary or the obtained cross-linked rubber is liable to fall in cross-linking density. On the other hand, if the temperature at the time of cross-linking is too high, poor molding is liable to result. The cross-linking time differs depending on the cross-linking method, the cross-linking temperature, shape, etc., but 1 minute or more and 5 hours or less in range is preferable from the viewpoints of the cross-linking density and production efficiency. As the heating method, press heating, oven heating, steam heating, hot air heating, microwave heating, or another method may be suitably selected.

Further, depending on the shape, size, etc. of the cross-linked rubber, even if the surface is cross-linked, sometimes the inside will not be sufficiently cross-linked. In such case, secondary cross-linking may be carried out by further heating. At the time of secondary cross-linking, as the heating temperature, 100 to 220° C. is preferable, while 130 to 210° C. is more preferable. As the heating time, 30 minutes to 5 hours is preferable.

The cross-linked rubber of the present invention has a volume resistivity value in a measurement environment of a temperature of 23° C. and a humidity of 50%, when making the applied voltage 250V, of a value after 30 seconds from the start of application of voltage of usually $1\times10^{5.0}$ to $1\times10^{8.5}$ Ω·cm, preferably $1\times10^{5.2}$ to $1\times10^{8.0}$ Ω·cm, more preferably $1\times10^{5.5}$ to $1\times10^{7.5}$ Ω·cm. If the cross-linked rubber has a volume resistivity value which is too high, to run the same current, a higher voltage has to be applied and the power consumption becomes greater, so this is not suited for a conductive member. On the other hand, if too low, current ends up flowing in an unintended direction other than the direction of application of the voltage and the function as a conductive member is liable to be impaired.

The thus obtained cross-linked rubber of the present invention is obtained by using the above-mentioned rubber composition which is obtained by the production method of the present invention, so is one which has a low volume resistivity value, which is low in hardness, and which, when used as a conductive member, is effectively kept down in contamination of the photoconductor. For this reason, the cross-linked rubber of the present invention makes use of such properties and is useful as a material for rubber products in various industries, for example, can be used as conductive rolls, conductive blades, conductive belts, or other conductive members which are used for copiers, printers, etc.; materials for shoe soles or hoses; materials for conveyor belts or escalator handles or other belts; seals, packing materials; etc. Among these as well, use as conductive members which are used for copiers, printers, etc. is preferable. In particular, suitable use for conductive rolls is possible. When using the cross-linked rubber of the present invention as a conductive member which is used for a copier, printer, etc., it is possible to effectively prevent the trouble of other members, in particular, the photoconductor, from ending up becoming contaminated. Due to this, a superior image quality can be achieved.

EXAMPLES

Below, the present invention is described in detail with reference to the examples and comparative examples. Note that, the "parts" and "%" in the examples are based on weight unless otherwise particularly indicated. Note that, the tests and evaluations were performed as follows:

[Mooney Viscosity]
The Mooney viscosity (ML1+4,100° C.) was measured in accordance with JIS K6300 at 100° C.

[Volume Resistivity Value]
The obtained sheet-shaped cross-linked rubber (length 15 cm, width 10 cm, thickness 2 mm) was used to measure the volume resistivity value. Specifically, based on the double ring electrode method of JIS K6271, under conditions of a temperature of 23° C., a humidity of 50%, and an applied voltage of 250V, the value after 30 seconds from the start of application of the voltage was measured. The smaller the volume resistivity value, the better the conductivity.

[Measurement of Hardness]
The hardness was measured using the obtained sheet-shaped cross-linked rubber (length 15 cm, width 10 cm, thickness 2 mm) in accordance with JIS K6253 and using a type A durometer.

[Photoconductor Contamination]
The photoconductor contamination was measured as follows. That is, first, the obtained sheet-shaped cross-linked rubber (length 15 cm, width 10 cm, thickness 2 mm) was cut to a length 2 cm, width 2 cm, this was fastened stuck to a photoconductor of a commercially available printer and was stored in an atmosphere of a temperature of 40° C. and a humidity of 95% for 14 days, then was stored in an atmosphere of a temperature 23° C. and a humidity of 50% for 24 hours. After that, the sheet-shaped cross-linked rubber was peeled off the photoconductor, the printer was used for half tone printing, and any contamination of the printed matter was visually checked for. The results were evaluated by the following three stages of criteria.

1 point: Remarkable image defects occurred. Not practically usable level.

2 points: Close inspection reveals some image defects. Practically usable level.

3 points: No image defects seen. Fully practically usable level.

[Production Example 1, Preparation of Catalyst Solution]
A tightly sealed pressure resistant glass bottle was purged by replacement by nitrogen, 184.8 parts of toluene and 55.2 parts of triisobutyl aluminum were charged, the glass bottle was immersed in ice water for cooling, then 103.1 parts of diethylether were filled in the glass bottle and the contents were stirred. Next, the glass bottle, while continuing to be cooled by ice waer, was filled with 8.18 parts of phosphoric acid and the contents were further stirred. At this time, the reaction between the triisobutyl aluminum and phosphoric acid caused the inside pressure of the glass bottle to rise, so the pressure was vented at suitable times. Next, the glass bottle was filled with 8.27 parts of formic acid salt of 1,8-diaza-bicyclo(5,4,0)undecene-7, then finally an aging reaction was performed in a warm water bath at 60° C. for 1 hour to thereby obtain a catalyst solution.

[Production Example 2, Production of Polyether Rubber]
An autoclave was charged with 212.4 parts of epichlorohydrin, 26.2 parts of allyl glycidyl ether, 18.4 parts of ethylene oxide, and 2053.8 parts of toluene, the contents were stirred under a nitrogen atmosphere while raising the temperature of the contents to 70° C., and 10 parts of the above prepared catalyst solution was added to start the reaction. Next, from right after the start of the reaction, a solution of 123.0 parts of ethylene oxide dissolved in 287.0 parts of toluene was continuously added for 5 hours at an equal speed. At the same time, 7 parts of the above prepared catalyst solution was added every 30 minutes for 5 hours. After that, 15 parts of water was added to the reaction system and the system were stirred so as to cause the reaction to end. Furthermore, as an antioxidant, 38 parts of a 4,4'-thiobis-(6-tert-butyl-3-methylphenol) 5 wt % toluene solution was added and the contents were stirred. Next, steam stripping was performed to remove the toluene, the supernatant water was removed, then the result was vacuum dried at 60° C. for 15 hours to thereby obtain 361.0 parts of polyether rubber. The obtained polyether rubber had a Mooney viscosity of 45. Further, as a result of 1H-NMR analysis, it could be confirmed that the obtained polyether rubber had a ratio of composition of monomers of 56 mol % of ethylene oxide monomer units, 40 mol % of epichlorohydrin monomer units, and 4 mol % of allylglycidyl ether monomer units.

Example 1

A stirring vessel equipped with stirring blades was charged with 100 parts of polyether rubber obtained in Production Example 2 and 900 parts of acetone. The result was stirred at 23° C. for 12 hours to obtain a 10 wt % acetone solution of polyether rubber. Further, a separate stirring vessel other than the above was charged with 900 parts of the obtained 10 wt % acetone solution of polyether rubber (converted to 90 parts of polyether rubber) and 10 parts of liquid nitrile rubber (acrylonitrile-butadiene rubber (acrylonitrile: 29.5 wt %), product name "Nipol 1312", made by Zeon Corporation) and the mixture was stirred at 40° C. for 2 hours to obtain an acetone solution in which polyether rubber and liquid nitrile rubber are both dissolved and mixed constituting a rubber composition. Next, the obtained acetone solution of polyether rubber and liquid nitrile rubber constituting a rubber composition was steam stripped, then the slurry was filtered and thereby rubber component was obtained. The obtained rubber component was vacuum dried at 60° C. for 15 hours to obtain 100 parts of a mixture of polyether rubber and liquid nitrile rubber (polyether rubber: liquid nitrile rubber=90:10 (weight ratio)) constituting a rubber composition.

Further, a Banbury mixer was charged with 100 parts of the mixture of polyether rubber and liquid nitrile rubber obtained above, 10 parts of carbon black as a filler (Seast SO, made by Tokai Carbon), 5 parts of zinc oxide as a cross-linking acceleration aid (ZnO#1, made by Seido Chemical Industry), and 0.5 part of stearic acid as a cross-linking acceleration aid. These were kneaded at 50° C. for 5 minutes, then the mixture was discharged from the Banbury mixer. Next, an open roll at 50° C. was charged with this mixture, 0.5 part of sulfur as a cross-linking agent (Sulfax PMC, made by Tsurumi Chemical Industry), 1 part of morpholine disulfide as a cross-linking agent (Vulnoc R, made by Ouchi Shinko Chemical Industrial), 1 part of tetraethylthiuram disulfide as a cross-linking accelerator (Noccelar TET, made by Ouchi Shinko Chemical Industrial), and 1.5 parts of dibenzothiazyl disulfide as a cross-linking accelerator (Noccelar DM, made by Ouchi Shinko Chemical Industrial), the mixture was kneaded for 10 minutes, then the rubber composition was taken out. This rubber composition was cross-linked at 170° C. for 20 minutes by pressing to obtain a length 15 cm, width 10 cm, thickness 2 mm sheet-shaped cross-linked rubber. The obtained cross-linked rubber was used in accordance with the above method to measure and evaluate the volume resistivity value, hardness, and photoconductor contamination. The results are shown in Table 1.

Example 2

When preparing the mixture of the polyether rubber and liquid nitrite rubber, other than making the amount of the 10 wt % acetone solution of polyether rubber 800 parts (converted to 80 parts of polyether rubber) and making the amount of the liquid nitrile rubber 20 parts, the same procedure was followed as in Example 1 to obtain a mixture of a polyether rubber and liquid nitrite rubber (polyether rubber:liquid nitrile rubber=80:20 (weight ratio)) as a rubber composition, then the same procedure was followed as in Example 1 to obtain a rubber composition and cross-linked rubber. Further, the obtained cross-linked rubber was measured and evaluated in the same way as Example 1. The results are shown in Table 1.

Example 3

A stirring vessel equipped with stirring blades was charged with 250 parts of polyether rubber obtained in Production Example 2 and 750 parts of acetone. The result was stirred at 23° C. for 16 hours to obtain a 25 wt % acetone solution of polyether rubber. Further, a separate stirring vessel other than the above was charged with 360 parts of the obtained 25 wt % acetone solution of polyether rubber (converted to 90 parts of polyether rubber) and 10 parts of liquid nitrile rubber (acrylonitrile-butadiene rubber (acrylonitrile: 29.5 wt %), product name "Nipol 1312", made by Zeon Corporation), and the mixture was stirred at 40° C. for 2 hours to obtain an acetone solution in which polyether rubber and liquid nitrile rubber are both dissolved and mixed constituting a rubber composition. Next, the obtained acetone solution of polyether rubber and liquid nitrile rubber constituting a rubber composition was steam stripped, then the slurry was filtered and thereby rubber component was obtained. The obtained rubber component was vacuum dried at 60° C. for 15 hours to obtain 100 parts of a mixture of polyether rubber and liquid nitrile rubber (polyether rubber: liquid nitrile rubber=90:10 (weight ratio)) constituting a rubber composition.

Further, except for using the thus obtained mixture of polyether rubber and liquid nitrile rubber, the same procedure was followed as in Example 1 to prepare the rubber composition and the cross-linked rubber. The obtained cross-linked rubber was measured and evaluated in the same way as the Example 1. The results are shown in Table 1.

Example 4

When preparing the rubber composition, except for changing the amount of the rubber component constituted by the mixture of polyether rubber and liquid nitrile rubber from 100 parts to 80 parts and using 20 parts of solid nitrile rubber (acrylonitrile-butadiene rubber, product name "Nipol DN40 1 LL", made by Zeon Corporation) as the other rubber component, the same procedure was followed as in Example 1 to obtain the rubber composition and the cross-linked rubber. The obtained cross-linked rubber was measured and evaluated in the same way as Example 1. The results are shown in Table 1.

Comparative Example 1

When preparing the rubber composition, except for charging, as the rubber component, 90 parts of polyether rubber obtained in Production Example 2 and 10 parts of liquid nitrile rubber directly into a Banbury mixer without mixing in an acetone solution, the same procedure was followed as in Example 1 to prepare the rubber composition and the cross-linked rubber. The obtained cross-linked rubber was measured and evaluated in the same way as Example 1. The results are shown in Table 1.

Comparative Example 2

A stirring vessel equipped with stirring blades was charged with 400 parts of polyether rubber obtained in Production Example 2 and 600 parts of acetone. The result was stirred at 23° C. for 24 hours to obtain a 40 wt % acetone solution of polyether rubber. Further, a separate stirring vessel other than the above was charged with 225 parts of the obtained 40 wt % acetone solution of polyether rubber (converted to 90 parts of polyether rubber) and 10 parts of liquid nitrile rubber (acrylonitrile-butadiene rubber (acrylonitrile: 29.5 wt %), product name "Nipol 1312", made by Zeon Corporation) and the mixture was stirred at 40° C. for 2 hours to obtain an acetone solution in which polyether rubber and liquid nitrile rubber are both dissolved and mixed constituting a rubber composition. Next, the obtained acetone solution of polyether rubber and liquid nitrile rubber constituting a rubber composition was steam stripped, then the slurry was filtered and thereby rubber component was obtained. The obtained rubber component was vacuum dried at 60° C. for 15 hours to obtain 100 parts of a mixture of polyether rubber and liquid nitrile rubber (polyether rubber: liquid nitrile rubber=90:10 (weight ratio)) constituting a rubber composition.

Further, except for using the thus obtained mixture of polyether rubber and liquid nitrile rubber, the same procedure was followed as in Example 1 to prepare the rubber composition and the cross-linked rubber. The obtained cross-linked rubber was measured and evaluated in the same way as the Example 1. The results are shown in Table 1.

Comparative Example 3

When preparing the rubber composition, except for charging, as the rubber component, 70 parts of polyether rubber obtained in Production Example 2 and 10 parts of liquid nitrile rubber directly into a Banbury mixer without mixing in an acetone solution and using 20 parts of solid nitrile rubber (acrylonitrile-butadiene rubber, product name "Nipol DN401LL", made by Nippon Zeon) as the other rubber component, the same procedure was followed as in Example 1 to prepare the rubber composition and the cross-linked rubber. The obtained cross-linked rubber was measured and evaluated in the same way as Example 1. The results are shown in Table 1.

TABLE 1

| | | | Examples | | | | Comparative examples | | |
|---|---|---|---|---|---|---|---|---|---|
| | | | 1 | 2 | 3 | 4 | 1 | 2 | 3 |
| Mixing conditions of polyether rubber and liquid nitrile rubber | | | | | | | | | |
| Form. | Polyether rubber | (parts) | 90 | 80 | 90 | 90 | — | 90 | — |
| | Liquid nitrile rubber | (parts) | 10 | 20 | 10 | 10 | — | 10 | — |
| Mixing method | | | Solution mixing | Solution mixing | Solution mixing | Solution mixing | Solid mixing | Solution mixing | Solid mixing |
| Acetone solution concentration of polyether rubber | | (%) | 10 | 10 | 25 | 10 | — | 40 | — |
| Polyether rubber | | (parts) | 90 | 80 | 90 | 72 | 90 | 90 | 70 |
| Liquid nitrile rubber | | (parts) | 10 | 20 | 10 | 8 | 10 | 10 | 10 |
| Solid nitrile rubber | | (parts) | — | — | — | 20 | — | — | 20 |
| Carbon black | | (parts) | 10 | 10 | 10 | 10 | 10 | 10 | 10 |
| Zinc oxide | | (parts) | 5 | 5 | 5 | 5 | 5 | 5 | 5 |
| Stearic acid | | (parts) | 0.5 | 0.5 | 0.5 | 0.5 | 0.5 | 0.5 | 0.5 |
| Sulfur | | (parts) | 0.5 | 0.5 | 0.5 | 0.5 | 0.5 | 0.5 | 0.5 |
| Morpholine disulfide | | (parts) | 1 | 1 | 1 | 1 | 1 | 1 | 1 |
| Tetraethylthiuram disulfide | | (parts) | 1 | 1 | 1 | 1 | 1 | 1 | 1 |
| Dibenzothiazyl disulfide | | (parts) | 1.5 | 1.5 | 1.5 | 1.5 | 1.5 | 1.5 | 1.5 |
| Evaluation | | | | | | | | | |
| Volume resistivity value | | $\log_{10}$(volume resistivity value) | 7.1 | 7.3 | 7.1 | 7.2 | 7.2 | 7.4 | 7.3 |
| Hardness | | (Duro A) | 39 | 33 | 39 | 42 | 40 | 35 | 43 |
| Photoconductor contamination | | | 3 | 2 | 3 | 3 | 1 | 1 | 1 |

Note that, in Table 1, the measurement results of the volume resistivity value were shown by the log of the volume resistivity value (that is, log10 (volume resistivity value)).

As shown in Table 1, when mixing polyether rubber and liquid nitrile rubber, the polyether rubber was rendered into a state dissolved at 0.1 to 30 wt % of concentration in acetone and mixing these in the solution, the obtained cross-linked rubber in each case was one which had a low volume resistivity value, which was low in hardness, and which was suitably prevented from contaminating the photoconductor (Examples 1 to 4).

On the other hand, when mixing the polyether rubber and liquid nitrile rubber in a solid state, the obtained cross-linked rubber ended up contaminating the photoconductor and was not desirable as a conductive member which is used for a copier or printer etc (Comparative Example 1 and Comparative Example 3).

Further, when mixing polyether rubber and liquid nitrile rubber in a solution, when mixing the polyether rubber in a state dissolved at 40 wt % of concentration in acetone, the obtained cross-linked rubber ended up contaminating the photoconductor and was not desirable as a conductive member which is used for a copier or printer etc (Comparative Example 2).

The invention claimed is:

1. A production method of a rubber composition comprising a rubber component, which comprises a polyether rubber and a liquid ethylenically unsaturated nitrile-conjugated diene copolymer rubber, and a cross-linking agent, the production method comprising
    a first step of mixing in a solution:
        the polyether rubber dissolved in a solvent at 5 to 30 wt % concentration of the polyether rubber, wherein the polyether rubber has, as main structural unit, oxyalkylene repeating units which are obtained by polymerizing an oxirane monomer by ring opening polymerization, wherein the polyether rubber comprises ethylene oxide monomer units in an amount of 40 to 80 mol %; and the liquid ethylenically unsaturated nitrile-conjugated diene copolymer rubber, wherein the liquid ethylenically unsaturated nitrile-conjugated diene copolymer rubber contains 10 to 60 wt % of ethylenically unsaturated nitrile monomer units and 40 to 90 wt % of conjugated diene monomer units, a second step of coagulating and drying a composition containing the rubber component, which comprises the polyether rubber and the liquid ethylenically unsaturated nitrile-conjugated diene copolymer rubber, and the solvent so as to remove the solvent and obtain a solid composition, and a third step of adding the cross-linking agent to the solid composition.

2. The production method of a rubber composition as set forth in claim 1, wherein the ratio of said polyether rubber in the rubber component is 60 to 99 wt % and the ratio of said liquid ethylenically unsaturated nitrile-conjugated diene copolymer rubber in the rubber component is 40 to 1 wt %.

3. The production method of a rubber composition as set forth in claim 1, wherein said liquid ethylenically unsaturated nitrile-conjugated diene copolymer rubber is a liquid acrylonitrile-butadiene rubber.

4. The production method of a rubber composition as set forth in claim 2, wherein the ratio of said polyether rubber in the rubber component is 70 to 99 wt % and the ratio of said liquid ethylenically unsaturated nitrile-conjugated diene copolymer rubber in the rubber component is 30 to 1 wt %.

5. The production method of a rubber composition as set forth in claim 1, wherein the rubber composition further comprises a cross-linking accelerator, and the third step is a step where the cross-linking accelerator is further added to the solid composition in addition to the cross-linking agent.

6. The production method of a rubber composition as set forth in claim 1, wherein the rubber composition further comprises a cross-linking accelerator and carbon black, and the third step is a step where the cross-linking accelerator and the carbon black are further added to the solid composition in addition to the cross-linking agent.

7. The production method of a rubber composition as set forth in claim 1, wherein, in the first step, a rubber other than the polyether rubber and the liquid ethylenically unsaturated nitrile-conjugated diene copolymer rubber is not used.

8. The production method of a rubber composition as set forth in claim 1, the solvent is one or more selected from the group consisting of toluene, tetrahydrofuran, anisole, diethyl ether, ethyl acetate, ethyl benzoate, acetone, 2-butanone, acetophenone, acetonitrile, dimethylformamide, and dimethylsulfoxide.

* * * * *